United States Patent
Hayashi et al.

(10) Patent No.: US 8,646,983 B2
(45) Date of Patent: Feb. 11, 2014

(54) ROLLING BEARING

(75) Inventors: Yuichiro Hayashi, Yao (JP); Takeshi Yamamoto, Izumisano (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 100 days.

(21) Appl. No.: 12/998,219

(22) PCT Filed: Oct. 2, 2009

(86) PCT No.: PCT/JP2009/067243
§ 371 (c)(1),
(2), (4) Date: Mar. 28, 2011

(87) PCT Pub. No.: WO2010/038866
PCT Pub. Date: Apr. 8, 2010

(65) Prior Publication Data
US 2011/0176761 A1 Jul. 21, 2011

(30) Foreign Application Priority Data

Oct. 3, 2008 (JP) .............................. P2008-258504
Oct. 3, 2008 (JP) .............................. P2008-258522

(51) Int. Cl.
*F16C 43/04* (2006.01)
(52) U.S. Cl.
USPC .......................................................... 384/470
(58) Field of Classification Search
USPC .................. 384/466, 468, 470, 471, 473–475
See application file for complete search history.

(56) References Cited

U.S. PATENT DOCUMENTS

| 3,042,462 | A | * | 7/1962 | Rosskopf | 384/466 |
|---|---|---|---|---|---|
| 3,195,965 | A | * | 7/1965 | Van Dorn | 384/475 |
| 5,399,027 | A | * | 3/1995 | Ijuin et al. | 384/475 |
| 6,328,478 | B1 | * | 12/2001 | Fukuda et al. | 384/475 |
| 2002/0009245 | A1 | * | 1/2002 | Sugita et al. | 384/466 |
| 2005/0129342 | A1 | * | 6/2005 | Azumi et al. | 384/466 |
| 2008/0063331 | A1 | * | 3/2008 | Mori et al. | 384/468 |
| 2011/0176761 | A1 | | 7/2011 | Hayashi et al. | |

FOREIGN PATENT DOCUMENTS

| JP | 58-189819 | 12/1983 |
|---|---|---|
| JP | 5-60145 A | 3/1993 |

(Continued)

OTHER PUBLICATIONS

Japanese Notification of Reasons for Refusal dated Oct. 29, 2013 with English translation.

*Primary Examiner* — James Pilkington
*Assistant Examiner* — Richard Urbanski
(74) *Attorney, Agent, or Firm* — McGinn IP Law Group, PLLC

(57) ABSTRACT

A rolling bearing includes: a first raceway member; a second raceway member; rolling elements; a guide member; and a cage. The guide member is formed integrally with or separately from the second raceway surface, and includes: an annular guide surface arranged at a position different from a second raceway surface of the second raceway member in an axial direction; a flow path in which compressed air for supplying lubricating oil flows; and an annular groove provided in the guide surface in a circumferential direction. The annular groove has: a discharge opening connected to the flow path in a groove bottom part; and an introducing surface configured to introduce the compressed air toward the second raceway member in the axial direction. The annular cage holds the rolling elements and has a guided surface opposing the guide surface such that the guided surface can slidably contact the guide surface.

10 Claims, 3 Drawing Sheets

(56) References Cited

FOREIGN PATENT DOCUMENTS

| | | | |
|---|---|---|---|
| JP | 5-263830 | A | 10/1993 |
| JP | 2006-283984 | A | 10/2006 |
| JP | 2007-247784 | A | 9/2007 |
| JP | 2008-121888 | A | 5/2008 |
| JP | 5320955 | B2 | 10/2013 |

* cited by examiner

ROLLING BEARING

TECHNICAL FIELD

The present invention relates to a rolling bearing, and more particularly to a rolling bearing of a type which sprays compressed air of an oil/air lubrication system to a part between a cage and a guide surface thereof.

BACKGROUND ART

Generally, a rolling bearing such as a cylindrical roller bearing includes: an outer ring; an inner ring concentrically arranged inside the outer ring in a radial direction; a plurality of rolling elements arranged between the outer ring and the inner ring so as to roll; and a cage for holding circumferential intervals of the plurality of rolling elements. Further, as a guide system of the cage of the rolling bearing, three guide systems are known, which include an outer ring guide, an inner ring guide and a rolling element guide.

In the rolling element guide of the above-described guide systems, a heat generation or seizure is likely to occur in a pocket of the cage due to: a runout of the cage caused by a centrifugal force generated during a high speed rotation; an increase in a surface pressure by a load received from the rolling elements and a shortage of lubrication on a slide surface. Thus, the rolling element guide is disadvantageous in view of durability. As compared therewith, since the outer ring guide or the inner ring guide (hereinafter refer to as a bearing ring guide) has a higher abrasion resistance performance during the high speed rotation than the rolling element guide, the bearing ring guide can be preferably used, for example, for supporting a main spindle of a machine tool. However, even in the bearing ring guide, the abrasion resistance performance is desired to be more improved. Here, in order to more reduce an abrasion due to a contact of the cage and a bearing ring, lubrication between both the members is requested to be properly maintained. Especially, it is effective to suppress the abrasion in a position where the abrasion is likely to occur.

Further, a radial position of the cage is requested to be stabilized so that the cage is not inclined.

A below-described Patent Document 1 discloses that lubricating oil is supplied to a part between a cage and an outer ring so as to prevent an abrasion or seizure due to a contact of both the members.

Further, the below-described Patent Document 1 discloses that compressed air is discharged from supply holes formed in the outer ring at both sides of a rolling element in the axial direction and the lubricating oil fed by the compressed air is supplied to the part between the cage and the outer ring to prevent the abrasion or seizure due to the contact of both the members. In this technique, the compressed air is sprayed to both the sides of the cage in the axial direction so that the cage may be hardly inclined, however, a rolling bearing of a type is not particularly considered that only one side of a cage in the axial direction is guided by a bearing ring.

RELATED ART DOCUMENTS

Patent Documents

Patent Document 1: JP-A-5-60145

SUMMARY OF THE INVENTION

Problem to be Solved by the Invention

An object of the present invention is to provide a rolling bearing capable of properly maintaining lubrication between a cage and a guide surface and suppress an abrasion in a position where the abrasion is especially likely to occur.

Further, an object of the present invention is to provide a rolling bearing of a type that only one side of a cage in the axial direction is guided by a bearing ring in which lubrication between the cage and a guide surface can be properly maintained, a radial position of the cage can be stabilized, and an abrasion or seizure of the cage can be preferably prevented.

Means for Solving the Problem

According to a first aspect of the present invention, a rolling bearing of the present invention includes: a first raceway member having a first annular raceway surface; a second raceway member having a second annular raceway surface opposing the first raceway surface; a plurality of rolling elements arranged between the first raceway surface and the second raceway surface so as to roll; a guide member formed integrally with or separately from the second raceway surface, the guide member including: an annular guide surface arranged at a position different from the second raceway surface in an axial direction; a flow path in which compressed air for supplying lubricating oil flows; and an annular groove provided in the guide surface in a circumferential direction and having a discharge opening connected to the flow path in a groove bottom part and an introducing surface configured to introduce the compressed air toward the second raceway member in the axial direction; and an annular cage that holds the plurality of rolling elements at given intervals in the circumferential direction and has a guided surface which opposes the guide surface such that the guided surface can slidably contact the guide surface.

According to the above-described structure, when the compressed air for supplying the lubricating oil of an oil/air lubrication system is discharged from the discharge opening of the flow path, the compressed air is guided so as to flow to an inner side in the axial direction by the introducing surface of the annular groove. When the guided surface of the cage contacts an inner side end edge (for instance, a part shown by reference numeral 15e in FIG. 1) of the guide surface in the axial direction, an abrasion is likely to occur in the contact part. However, in the present invention, since the guided surface of the cage hardly contacts the inner side end edge of the guide surface in the axial direction by the pressure of the compressed air introduced to the inner side in the axial direction, and the lubricating oil can be positively supplied to the part, a local abrasion of the cage in this part can be suppressed.

In the above-described structure, the introducing surface may include a side wall surface arranged in an inner side of the annular groove in the axial direction or side wall surfaces at both sides in the axial direction. In both cases, the side wall surface is preferably formed as an inclined surface which is inclined toward the inner side in the axial direction from a groove bottom side to an opening side of the annular groove. Further, when an inferior angle formed by the side wall surface arranged in the inner side of the annular groove in the axial direction and the guide surface is $\alpha$, and an inferior angle formed by the side wall surface arranged in the outer side in the axial direction and the guide surface is $\beta$, a relation expressed by $\beta<\alpha$ is preferably set. Thus, the compressed air discharged from the discharge opening can be preferably introduced to the inner side in the axial direction.

The guide member preferably includes a spacer arranged to be adjacent to the second raceway member. Since the spacer is a member separated from the second raceway member, the spacer may be made of a material high in its heat radiation which is different from that of the second raceway member or the volume (mass) of the spacer may be increased more than that of the second raceway member to improve the heat radiation. Thus, the rise of temperature of the guide member due to the contact with the cage can be suppressed and the seizure can be prevented.

According to a second aspect of the present invention, a rolling bearing of the present invention includes: a first raceway member having a first annular raceway surface; a second raceway member having a second annular raceway surface opposing the first raceway surface; a plurality of rolling elements arranged between the first raceway surface and the second raceway surface so as to roll; a guide member formed integrally with or separately from the second raceway surface, the guide member including: an annular guide surface arranged at a position different form the second raceway surface in an axial direction; a plurality of flow paths which are separately provided in the axial direction and in which compressed air for supplying lubricating oil flows; and discharge openings which spray the compressed air to a guided surface; and an annular cage that holds the plurality of rolling elements at given intervals in a circumferential direction and has the guided surface which opposes the guide surface such that the guided surface can slidably contact the guide surface.

According to the above-described structure, when the compressed air for supplying the lubricating oil of the oil/air lubrication system is discharged from the plurality of discharge openings formed to be separated in the axial direction and sprayed to the guided surface of the cage. Since the lubricating oil fed by the compressed air is supplied to a part between the guide surface and the guided surface, an abrasion or seizure due to the contact of the guide surface and the guided surface can be suppressed. Then, since the compressed air is sprayed to a plurality of positions separated in the axial direction relative to the guided surface of the cage, the cage is hardly inclined in the radial direction and a position of the cage can be stabilized with respect to the radial direction.

Preferably, in the above-described structure, the discharge openings are arranged in a plurality of rows in the axial direction such that in each of rows, the discharge openings are formed at plurality of positions in the circumferential direction, and a total amount of discharge of the compressed air from the discharge openings in each row is set to be larger in the row closer to the inner side in the axial direction. According to this structure, the compressed air is more discharged from the discharge openings of the row in the inner side in the axial direction (the rolling element side), so that an inner side part of the guided surface of the cage in the axial direction can be more strongly supported. Accordingly, the guided surface can be restrained from contacting an inner side end edge (for example, a part shown by reference numeral 15e in FIG. 1) of the guide surface in the axial direction, and the cage can be prevented from being locally abraded in the contact part.

Further, a total opening area of the discharge openings in each row can be set so as to be larger in the row closer to the inner side in the axial direction. Thus, the total amount of discharge can be more increased in the row the closer to the inner side in the axial direction by a simple structure.

The guide member is preferably a spacer arranged adjacent to the second raceway member. Thus, since the spacer is a member separated from the second raceway member, the spacer may be formed with a material high in its heat radiation which is different from that of the second raceway member or the volume (mass) may be more increased than that of the second raceway member to improve the heat radiation. Thus, the rise of temperature of the guide member due to a contact with the cage can be suppressed and seizure can be prevented.

Advantages of the Invention

According to the present invention, the lubrication between the cage and the guide surface can be properly maintained, and an abrasion can be suppressed in a position where the abrasion is especially likely to occur.

Further, the radial position of the cage can be stabilized and the abrasion or seizure of the cage can be preferably prevented.

MODE FOR CARRYING OUT THE INVENTION

First Exemplary Embodiment

Figure 1:
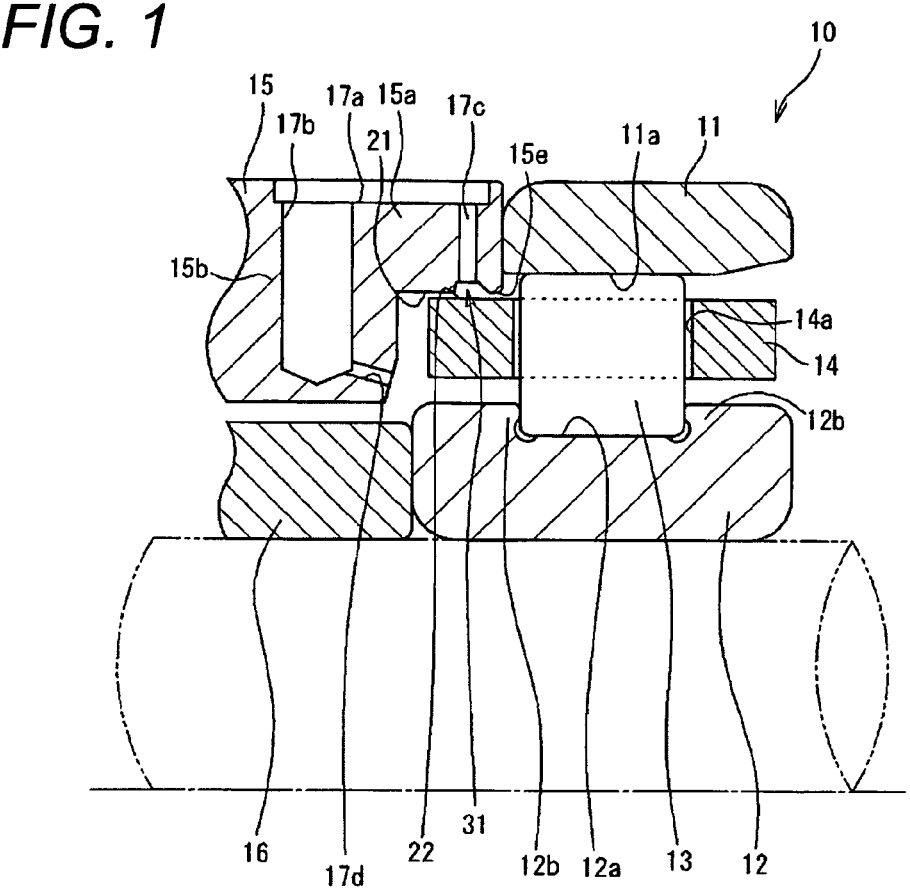
FIG. 1 is a sectional view of a rolling bearing according to a first exemplary embodiment of the present invention.

FIG. 1 is a sectional view of a rolling bearing 10 according to a first exemplary embodiment of the present invention. The rolling bearing 10 includes an annular outer ring (a second raceway member) 11, an inner ring (a first raceway member) 12 concentrically arrange in an inner peripheral side of the outer ring 11, a plurality of cylindrical rollers 13 as rolling elements arranged between the outer ring 11 and the inner ring 12 and a cage 14 for holding the cylindrical rollers 13 at prescribed intervals in the circumferential direction. In a below-described explanation, an axially outward (outside in the axial direction) direction means a direction directed toward both sides in the axial direction from a central part of the cylindrical roller bearing 10 in the axial direction (a center of a roller in the axial direction). An axially inward direction (inside in the axial direction) means a direction directed toward a central part in the axial direction from both sides of the cylindrical roller bearing 10 in the axial direction.

The outer ring 11 is a member formed in an annular shape by using alloy steel such as bearing steel. On an inner peripheral surface of the outer ring, an outer ring raceway surface 11a on which the cylindrical rollers 13 roll is formed along the circumferential direction.

The inner ring 12 is also a member formed in an annular shape by using the alloy steel such as the bearing steel. On an outer peripheral surface of the inner ring, an inner ring raceway surface 12a on which the cylindrical rollers 13 roll is formed so as to oppose the outer ring raceway surface 11a. Further, on the outer peripheral surface of the inner ring 12, an inner ring collar part 12b is formed that protrudes radially outward at both sides of the inner ring raceway surface 12a in the axial direction. By this inner ring collar part 12b, the axial movement of the cylindrical rollers 13 is regulated.

The plurality of cylindrical rollers 13 can roll on the outer ring raceway surface 11a and the inner ring raceway surface 12a. Thus, the outer ring 11 and the inner ring 12 are rotatable relative to each other.

The outer ring 11 has an axial length smaller than that of the inner ring 12. At one end in the axial direction (a right end in FIG. 1), the axial position of the outer ring corresponds to the axial position of the inner ring 12. However, the other end of the outer ring (a left end) is retracted from the inner ring 12 in the axial direction. On a left side of the outer ring 11 in the axial direction, an outer spacer 15 is provided adjacent thereto, and the axial position of the outer ring 11 is set by the outer spacer 15. Further, on a left side of the inner ring 12 in the axial direction, an inner spacer 16 is provided adjacent thereto and the axial position of the inner ring 12 is set by the inner spacer 16. The outer ring 11, the inner ring 12 and the spacers 15 and 16 may be respectively arranged in opposite sides of the right and left sides.

The outer spacer 15 has a large inner diameter at a part 15a adjacent to the outer ring 11 in the axial direction, and has a small inner diameter at a part 15b separated from the outer ring 11 in the axial direction. The part 15b is arranged outside the cage 14 in the axial direction (a left side in FIG. 1). An inner peripheral surface of the part 15b comes close to an outer peripheral surface of the inner spacer 16. An inner peripheral surface 21 of the part 15a adjacent to the outer ring 11 is arranged slightly inside the outer ring raceway surface 11a in the radial direction (the inner ring 12 side).

The cage 14 is a cylindrical member formed by using a synthetic resin such as a phenol resin and includes a plurality of pockets 14a that respectively accommodate and hold the plurality of cylindrical rollers 13 at prescribed intervals in the circumferential direction. The cage 14 is arranged between the outer ring 11 and the inner ring 12 so as to be substantially concentric with both the rings 11 and 12. One end of the cage 14 in the axial direction (the left side in FIG. 1) protrudes outward from the outer ring 11 in the axial direction. On an outer peripheral surface thereof, a guided surface 22 is provided so as to oppose the inner peripheral surface (a guide surface) 21 of the part 15a of the outer spacer 15 such that the guided surface 22 can slidably contact the inner peripheral surface 21.

When the outer ring 11 and the inner ring 12 are rotated relatively to each other to rotate the cage 14 and the outer spacer 15 relatively to each other, the guided surface 22 of the cage 14 slidably contacts the guide surface 21 of the outer spacer 15. Thus, the cage 14 is guided by the guide surface 21 so that the center of rotation of itself is substantially the same as the centers of rotation of the outer ring 11 and the inner ring 12. Accordingly, the outer spacer 15 functions as a guide member for guiding the rotation of the cage 14.

In the outer spacer 15, flow paths 17a to 17d are formed for supplying lubricating oil to the cylindrical roller bearing 10. The flow paths 17a to 17d include the peripheral groove 17a formed on an outer peripheral surface of the outer spacer 15 along the circumferential direction, a first flow path 17b formed inward from a bottom part of the peripheral groove 17a in the radial direction in the part 15b of the outer spacer 15, a second flow path 17c formed inward from the bottom part of the peripheral groove 17a in the radial direction and opened in the guide surface 21 in the part 15a closer to the outer ring 11 side than to the first flow path 17b and a third flow path 17d formed toward a part between the inner ring 12 and the cage 14 from an inner end part of the first flow path 17b in the radial direction. The first flow path 17b, the second flow path 17c and the third flow path 17d are formed at a plurality of positions (preferably, three or more positions) in the circumferential direction of the outer spacer 15.

To the flow paths 17a to 17d, the lubricating oil is supplied from a lubricating unit not shown in the drawing. As the lubricating unit, an oil/air lubrication system is used that supplies the lubricating oil little by little by compressed air. The lubricating oil is supplied to a part between the cage 14 and the inner ring 12 through the first flow path 17b and the third flow path 17d from the peripheral groove 17a to lubricate a part between the inner ring 12 and the cylindrical roller 13. Further, the lubricating unit supplies the lubricating oil to a part (a part between the guide surface 21 and the guided surface 22) between the outer spacer 15 and the cage 14 through the second flow path 17c from the peripheral groove 17a to mainly lubricate the part between them.

Figure 2:
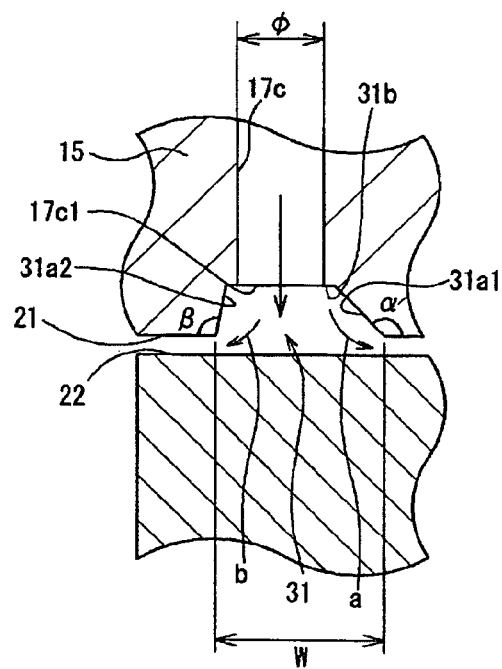
FIG. 2 is an enlarged sectional view of a main part of the rolling bearing according to the first exemplary embodiment.

FIG. 2 is a sectional view showing a main part (the part of the guide surface 21 and the guided surface 22) which is enlarged of the cylindrical roller bearing 10. The second flow path 17c has a discharge opening 17c1 arranged so as to be opened in a groove bottom part of an annular groove 31 formed in the guide surface 21.

The annular groove 31 is formed along the circumferential direction of the guide surface 21 and a sectional form passing an axis of the cylindrical roller bearing 10 is substantially trapezoid. The annular groove 31 has an opening width in the axial direction formed to be larger than a diameter of the second flow path 17c (a diameter of the discharge opening 17c1) Ø and includes one pair of side wall surfaces 31a1 and 31a2 inclined in opposite directions to each other so that a width is gradually larger to the opening side from the groove bottom side. A bottom surface 31b between the one pair of side wall surfaces 31a1 and 31a2 is a surface parallel to the guide surface 21 and has an axial width substantially the same as or slightly larger than the diameter Ø of the discharge opening 17c1 of the second flow path 17c.

The side wall surface 31a1 of an inner side (a right side in FIG. 2) of the annular groove 31 in the axial direction is formed as an inclined surface which is inclined inward in the axial direction as it goes inward in the radial direction. As compared therewith, the side wall surface 31a2 of an outer side (a left side in FIG. 2) of the annular groove 31 in the axial direction is formed as an inclined surface which is inclined outward in the axial direction as it goes inward in the radial direction. An inferior angle α formed by the side wall surface 31a1 of the inner side in the axial direction and the guide surface 21 and an inferior angle β formed by the side wall surface 31a2 of the outer side in the axial direction and the guide surface 21 satisfy below-described conditions (a) to (c).

$$\pi/2 < \alpha < \pi \quad \text{(a)}$$

$$\pi/2 < \beta < \pi \quad \text{(b)}$$

$$\beta < \alpha \quad \text{(c)}$$

The compressed air passing through the second flow path 17c is discharged from the discharge opening 17c1 and sprayed to the guided surfaced 22 through the annular groove 31. At this time, the compressed air is introduced to the inner side in the axial direction and to the outer side in the axial direction (see arrow marks a and b in FIG. 1) by the inclinations of the one pair of side wall surfaces 31a1 and 31a2 of the annular groove 31 and supplied to the part between the guide surface 21 and the guided surface 22 to supply the lubricating oil to the part between them.

Since the side wall surface 31a1 of the inner side of the annular groove 31 in the axial direction is more greatly inclined (β<α) than the side wall surface 31a2 of the outer side in the axial direction, the compressed air is supplied more to the inner side in the axial direction than to the outer side in the axial direction from the discharge opening 17c1. In such a way, by the pressure of a large amount of compressed air supplied to the inner side in the axial direction, as shown in FIG. 1, the guided surface 22 of the cage 14 hardly contacts an inner peripheral corner part (an inner side end edge of the guide surface 21 in the axial direction) 15e of the outer spacer 15 of the outer ring 11 side. Thus, the cage 14 can be restrained from being locally abraded in this part 15e. Further, since an amount of supply of the lubricating oil is increased by the large amount of compressed air supplied to the inner side in the axial direction from the discharge opening 17c1, the abrasion of the cage 14 in the part 15e can be more suppressed and the lubricating oil can be also positively supplied to a part between the cylindrical roller 13 and the outer ring raceway surface 11a.

Further, since the compressed air is discharged from the discharge opening 17c1 so that a contact surface pressure of the guide surface 21 and the guided surface 22 is lowered, a rotating resistance of the cage 14 can be reduced and an abrasion or seizure due to a contact of the guide surface 21 and the guided surface 22 can be suppressed.

Since the guide surface 21 that guides the cage 14 is formed in the outer spacer 15 separated from the outer ring 11, the outer spacer 15 may be made of a material high in its heat radiation which is different from that of the outer ring 11 or the volume (mass) of the outer spacer 15 may be increased to improve the heat radiation. In such a way, the heat radiation of the outer spacer 15 is improved, so that the rise of temperature of the outer spacer 15 due to the contact with the cage 14 can be suppressed and the seizure of the cage 14 can be prevented.

Since the guide surface 21 formed in the outer spacer 15 is arranged inside the outer ring raceway surface 11a in the radial direction, namely, in the inner ring 12 side (in the inner ring raceway surface 12a side), the guide surface 21 can be allowed to come close to the guided surface 22 of the cage 14 and can guide the cage 14 without forming the guided surface 22 of the cage 14 in such a special configuration as to largely protrude outward in the radial direction.

Second Exemplary Embodiment

Figure 3:
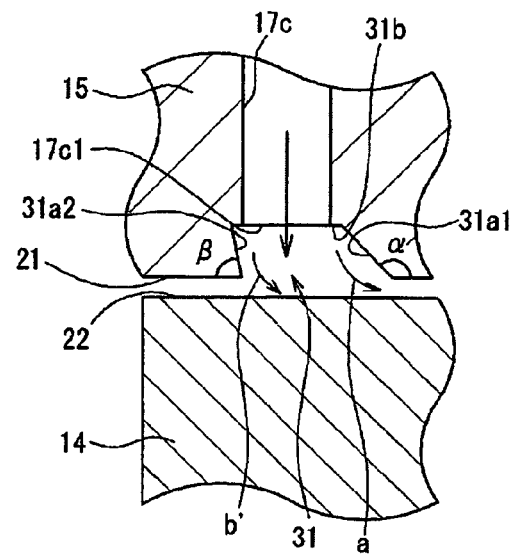
FIG. 3 is a sectional view of a main part of a rolling bearing according to a second exemplary embodiment.

FIG. 3 is an enlarged sectional view of a main part of a rolling bearing according to a second exemplary embodiment of the present invention. The present exemplary embodiment is different from the first exemplary embodiment in view of a point that an inferior angle 13 formed by a side wall surface 31a2 of an outer side of an annular groove 31 in the axial direction and a guide surface 21 is smaller than 90° (smaller than π/2). Further, the side wall surface 31a2 of the outer side in the axial direction has a degree of inclination to an inner side in the axial direction smaller than that of a side wall surface 31a1 of an inner side in the axial direction. Namely, in the present exemplary embodiment, an inferior angle α formed by the side wall surface 31a1 of the inner side in the axial direction and the guide surface 21 and an inferior angle β formed by the side wall surface 31a2 of the outer side in the axial direction and the guide surface 21 satisfy below-described conditions (d) to (f).

$$\pi/2 < \alpha < \pi \quad (d)$$

$$0 < \beta < \pi/2 \quad (e)$$

$$(\pi/2 - \beta) < (\alpha - \pi/2) \quad (f)$$

In the present exemplary embodiment, the side wall surface 31a2 of the outer side in the axial direction functions as an introducing surface for introducing compressed air to the inner side in the axial direction (see an arrow mark b'). Thus, operational effects of the first exemplary embodiment can be more improved.

The present invention is not limited to the above-described exemplary embodiments respectively and a design may be suitably changed. For instance, a guide surface 21 may be formed in an outer ring 11. In this case, a collar part may be formed for regulating an axial movement of a cylindrical roller 13 in an inner peripheral part of the outer ring 11 and an inner peripheral surface of the collar part may be used as the guide surface 21.

Further, in the exemplary embodiments respectively, the second flow path 17c, the guided surface 22, the guide surface 21 and the annular groove 31 may be provided at both sides in the axial direction with the cylindrical roller 13 sandwiched between them. However, the present invention is very advantageous to prevent the guided surface 22 of the cage 14 from contacting the inner side end edge 15e of the guide surface 21 in the axial direction in the cylindrical roller bearing 10 having the second flow path 17c, the guided surface 22 and the guide surface 21 provided only in one side in the axial direction.

The present invention may be applied to a rolling bearing in which a guide form of a cage is a guide form by an inner ring. Further, the present invention may be applied to other rolling bearings than a cylindrical roller bearing such as a ball bearing, a needle shaped roller bearing and a tapered roller bearing. Further, in the exemplary embodiments respectively, as the lubricating unit, the oil/air lubrication system is exemplified. However, the present invention may employ any lubrication system that supplies lubricating oil by using compressed air without a special limitation. For instance, other lubrication system such as an oil/mist lubrication system may be employed that supplies mist type lubricating oil by compressed air.

Third Exemplary Embodiment

Figure 4:
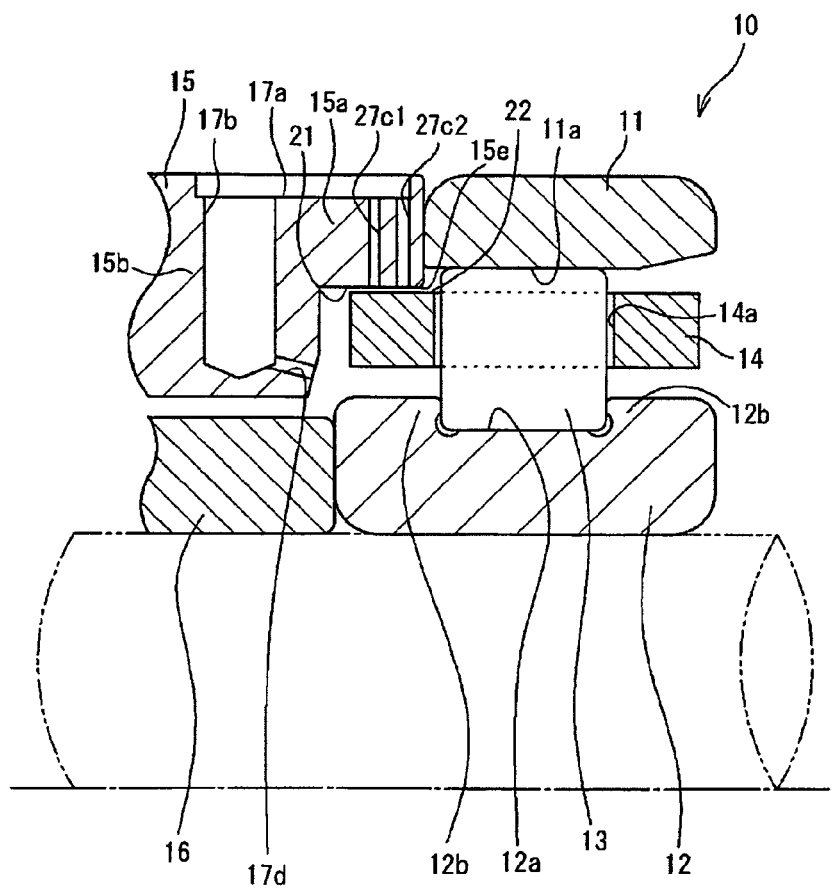
FIG. 4 is a sectional view of a rolling bearing according to a third exemplary embodiment of the present invention.
Figure 5:
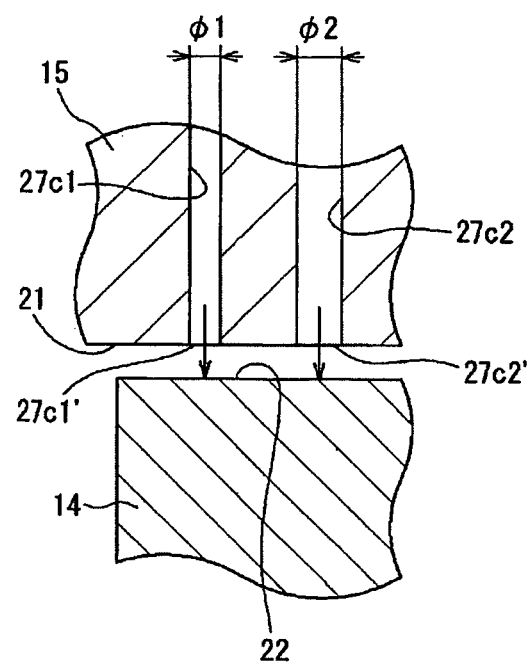
FIG. 5 is an enlarged sectional view of a main part of the rolling bearing according to the third exemplary embodiment.

FIG. 4 is a sectional view of a third exemplary embodiment of the present invention. FIG. 5 is a sectional view showing that a main part (a part of a guide surface 21 and a guided surface 22) of a rolling bearing of the present exemplary embodiment is enlarged. In FIG. 4 and FIG. 5, the same members as those of FIG. 1 and FIG. 2 are designated by the same reference numerals an explanation of them will be omitted.

To flow paths 17a to 17d and 27c1 and 27c2, lubricating oil is supplied from a lubricating unit not shown in the drawing. As the lubricating unit, an oil/air lubrication system is used that supplies the lubricating oil little by little by compressed air. The lubricating unit sprays the compressed air to a part between a cage 14 and an inner ring 12 through the first flow path 17b and the third flow path 17d from the peripheral groove 17a to supply the lubricating oil and lubricate a part between the inner ring 12 and a cylindrical roller 13. Further, the lubricating unit sprays the compressed air to a part (a part between the guide surface 21 and the guided surface 22) between an outer spacer 15 and the cage 14 through the second flow paths 27c1 and 27c2 from the peripheral groove 17a to supply the lubricating oil and mainly lubricate the part between them.

In the present exemplary embodiment, in the outer spacer 15, the second flow paths 27c1 and 27c2 opened in the guide surface 21 are provided. In the second flow paths 27c1 and 27c2, discharge openings 27c1' and 27c2' are arranged so as to oppose the guided surface 22.

In the present exemplary embodiment, the two second flow paths 27c1 and 27c2 are arranged in parallel in the axial direction on a prescribed section passing an axis of a cylindrical roller bearing 10. Further, in an entire circumference of the cylindrical roller bearing 10, a plurality of second flow paths 27c1 and 27c2 are formed respectively in the arrangements of two rows in the axial direction.

When the second flow paths 27c1 and 27c2 are arranged in the two rows in the axial direction as described above, the compressed air discharged respectively from the discharge openings 27c1' and 27c2' of the second flow paths 27c1 and 27c2 is sprayed to the guided surface 22, so that the retainer 14 can be supported at two positions in the axial direction. Thus, the cage 14 is hardly inclined in the radial direction and a position of the cage 14 can be stabilized with respect to the radial direction. Further, when the compressed air is sprayed to the guided surface 22, a contact surface pressure of the guide surface 21 and the guided surface 22 can be lowered, a rotating resistance of the cage 14 can be reduced and an abrasion or seizure due to the contact of the guide surface 21 and the guided surface 22 can be suppressed.

A diameter (a diameter of the discharge opening 27c2') Ø2 of each second flow path 27c2 of the row in an inner side (a right side in FIG. 5; the cylindrical roller 13 side) of the cylindrical roller bearing 10 in the axial direction is larger than a diameter (a diameter of the discharge opening 27c1') Ø1 of each second flow path 27c1 of the row of an outer side (a left side in FIG. 5) in the axial direction. Accordingly, a total opening area of the discharge opening 27c2' of the second flow path 27c2 of the row of the inner side in the axial direction is larger than a total opening area of the discharge opening 27c1' of the second flow path 27c1 of the row of the outer side in the axial direction. A total amount of discharge of the compressed air discharged from the second flow path 27c2 of the row of the inner side in the axial direction is larger than a total amount of discharge of the compressed air discharged from the second flow path 27c1 of the row of the outer side in the axial direction. Therefore, the cage 14 is more strongly supported by the compressed air discharged from the second flow path 27c2 of the row of the inner side in the axial direction.

Accordingly, the guided surface 22 of the cage 14 can be prevented from contacting an inner peripheral corner part (an inner side end edge of the guide surface 21 in the axial direction) 15e (see FIG. 4) of the outer spacer 15 of an outer ring 11 side, and the retained 14 can be prevented from being locally abraded in this part.

The present invention is not limited to the above-described exemplary embodiments respectively and a design may be suitably changed. For instance, a guide surface 21 may be formed in an outer ring 11. In this case, a collar part may be formed for regulating an axial movement of a cylindrical roller 13 in an inner peripheral part of the outer ring 11 and an inner peripheral surface of the collar part may be used as the guide surface 21. Further, in the exemplary embodiments, a flow rate of the compressed air supplied respectively to the second flow paths 27c1 and 27c2 of the rows may be changed by a flow rate control valve. Further, in the above-described embodiments, as the second flow path in which the compressed air flows, three or more rows of second flow paths may be formed in the axial direction.

The present invention may be applied to a rolling bearing in which a guide form of a cage is a guide form by an inner ring. Further, the present invention may be applied to other rolling bearings than a cylindrical roller bearing such as a ball bearing, a needle shaped roller bearing and a tapered roller bearing. Further, in the exemplary embodiments respectively, as the lubricating unit, the oil/air lubrication system is exemplified. However, the present invention may employ any lubrication system that supplies lubricating oil by using compressed air without a special limitation. For instance, other lubrication system such as an oil/mist lubrication system may be employed that supplies mist type lubricating oil by compressed air.

DESCRIPTION OF REFERENCE NUMERALS 10 cylindrical roller bearing
11 outer ring
12 inner ring
13 cylindrical roller
14 cage
15 outer spacer
17c flow path
17c1 discharge opening
27c1 flow path (narrow width)
27c2 flow path (wide width)
21 guide surface
22 guided surface
31 annular groove
31a1 side wall surface of inner side in axial direction (introducing surface)
31a2 side wall surface of outer side in axial direction (introducing surface)

The invention claimed is:

1. A rolling bearing comprising:
a first raceway member including a first annular raceway surface;
a second raceway member including a second annular raceway surface opposing the first raceway surface;
a plurality of rolling elements arranged between the first raceway surface and the second raceway surface so as to roll;
a guide member formed integrally with or separately from the second raceway surface, the guide member comprising:
    an annular guide surface arranged at a position different from the second raceway surface in an axial direction; and
    a flow path in which compressed air for supplying lubricating oil flows; and
    an annular groove having a substantially trapezoidal cross-section provided in the guide surface in a circumferential direction; the annular groove including:
        a discharge opening connected to the flow path in a groove bottom part; and
        an introducing surface, corresponding to a non-parallel side of the substantially trapezoidal cross-section, configured to introduce the compressed air toward the second raceway member in the axial direction; and
an annular cage that holds the plurality of rolling elements at given intervals in the circumferential direction and includes a guided surface which opposes the guide surface such that the guided surface can slidably contact the guide surface.

2. The rolling bearing according to claim 1,
wherein the introducing surface comprises a side wall surface arranged in an inner side of the annular groove which is arranged adjacent to said plurality of rolling elements in the axial direction, and
wherein the side wall surface is formed as an inclined surface which is inclined toward the inner side in the axial direction from a groove bottom side to an opening side of the annular groove.

3. The rolling bearing according to claim 1,
wherein the introducing surface comprises side wall surfaces at both sides in the axial direction, and wherein the side wall surfaces are formed as inclined surfaces which are inclined toward the second raceway member in the axial direction from a groove bottom side to an opening side of the annular groove.

4. The rolling bearing according to claim 2, wherein, when an inferior angle formed by the side wall surface arranged in the inner side of the annular groove and the guide surface is α and an inferior angle formed by the side wall surface arranged in an outer side of the annular groove in the axial direction and the guide surface is β, a relation expressed by β<α is set.

5. The rolling bearing according to claim 1, wherein the guide member comprises a spacer arranged to be adjacent to the second raceway member.

6. The rolling bearing according to claim 4, wherein the angle α satisfies the condition $\pi/2 < \alpha < \pi$.

7. The rolling bearing according to claim 6, wherein the angle β satisfies the condition $\pi/2 < \beta < \pi$.

8. The rolling bearing according to claim 7, wherein an opening width of the opening side of the annular groove in the axial direction is greater than a diameter of the flow path.

9. The rolling bearing according to claim 2, wherein an inferior angle formed by the side wall surface arranged in the inner side of the annular groove and the guide surface is α, and an inferior angle formed by the side wall surface arranged in an outer side of the annular groove in the axial direction and the guide surface is β, and the angle α and β satisfies the condition $(\pi/2 - \beta) < (\alpha - \pi/2)$.

10. The rolling bearing according to claim 1, wherein the groove bottom part corresponds to one of a pair of parallel sides of the substantially trapezoidal cross-section and extends in the axial direction.

* * * * *